United States Patent [19]
Antonsen

[11] Patent Number: 6,012,495
[45] Date of Patent: Jan. 11, 2000

[54] CORROSION PROTECTION FOR SUBSEA LINES

[75] Inventor: Roy Eivind Antonsen, Trondheim, Norway

[73] Assignee: Alcatel, Paris, France

[21] Appl. No.: 08/905,248

[22] Filed: Aug. 1, 1997

[30] Foreign Application Priority Data

Sep. 5, 1996 [NO] Norway .................................... 963703

[51] Int. Cl.[7] ............................. F16L 11/08; F16L 11/12; G02B 6/44
[52] U.S. Cl. ............................. 138/131; 174/47; 405/158
[58] Field of Search .................................... 138/110, 135, 138/114, 131; 350/96.23; 405/211.1; 228/112; 62/55

[56] References Cited

U.S. PATENT DOCUMENTS

| | | | |
|---|---|---|---|
| 3,889,716 | 6/1975 | Linhart | 138/131 |
| 4,143,540 | 3/1979 | Peterson et al. | 405/211.1 |
| 4,765,711 | 8/1988 | Obst | 350/96.23 |
| 5,275,209 | 1/1994 | Sugier et al. | 138/135 |
| 5,343,738 | 9/1994 | Skaggs | 138/114 |
| 5,349,989 | 9/1994 | Legallais | 138/114 |
| 5,362,921 | 11/1994 | Birkelund et al. | 138/110 |

FOREIGN PATENT DOCUMENTS 2 255 104 of 0000 United Kingdom .

*Primary Examiner*—Andres Kashnikow
*Assistant Examiner*—Davis Hwu
*Attorney, Agent, or Firm*—Ware, Fressola, Van der Sluys & Adolphson LLP

[57] ABSTRACT

The present invention relates to a subsea line comprising a number of fluid/gas conducting steel tubes (1, 3) and possibly other elongated elements (4) like electrical conductors and cables enclosed, and containing elongated sacrificial elements. At least one of the tubes (1, 3) is made of carbon steel and that at least one sacrificial element (2, 5) which is constituted by one or more tapes or strips made of a material less noble than steel is in substantially continuous contact with the surface(s) of at least one carbon steel tube. The line may include a sea water permeable outer cover (6).

8 Claims, 1 Drawing Sheet

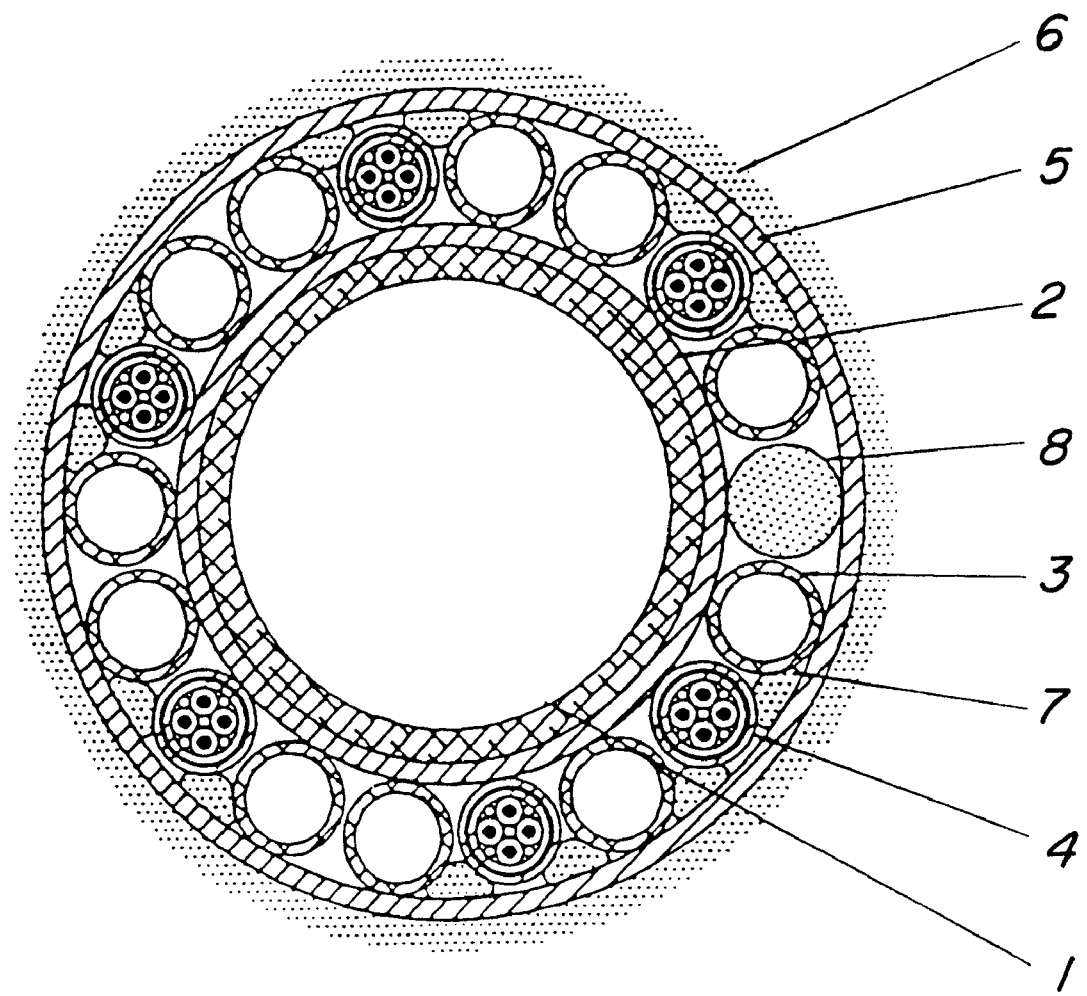

CORROSION PROTECTION FOR SUBSEA LINES

BACKGROUND OF THE INVENTION

1. Technical Field

The present invention relates to subsea lines comprising a number of fluid/gas conducting steel tubes and possibly other elongated elements like electrical conductors and cables,—possibly enclosed within a common outer cover. The invention relates in particular to corrosion protection of subsea lines having steel tubes for conducting control and service fluids for subsea installations, preferably static installations.

2. Description of the Prior Art

With a few exceptions, commercially available stainless steels are not sufficiently corrosion resistant when exposed to sea water. Additional corrosion protection, like cathodic protection will therefore be required also for stainless steel constructions that will—or might—be exposed to sea water.

Existing prior art include very expensive stainless steel umbilicals and zinc-plated steel tubes. The problem has been to achieve longtime corrosion protection of carbon steel umbilicals and tubes. Some prior art solutions are not good enough pricewise. Other solutions do not provide longtime protection. Most prior art solutions include an outer extruded polymer sheath to obtain a socalled 'dry' design.

Such arrangement will under certain circumstances be subjected to corrosion attacks, in particular when the tubes are covered with an outer plastic sheath. Mechanical damage to the plastic sheath may, if there is insufficient contact between the tubes and the sheath, lead to water penetration. In such situations, sacrificial anodes on the outside will not give sufficient cathodic protection to the narrow interstices under the plastic sheath.

A common type of umbilical consists of a large center tube with a number of smaller tubes stranded around the large tube. There are, however, also other configurations.

From our UK Patent GB 2 255 104 B there are known subsea lines and umbilicals having corrosion protection satisfying most offshore requirements. The cathodic protection of the stainless steel tubes is obtained by a 'built in' sacrificial anode system. The outer surfaces of the small tubes achieve cathodic protection from integrated zinc ires, while the lower surfaces of the tubes are protected by galvanized steel tape. This is, however, also a 'dry' design, relying on a nonpenetrable outer cover.

SUMMARY OF THE INVENTION

The object of the present invention is to improve the corrosion protection of subsea static lines in order to satisfy offshore requirements. The main features of the invention are defined in the claims.

The basic idea was to design away from stainless steel tubes to reduce expenses and not rely on polymer plastic covers because such coatings can reduce the effect of a cathodic protection system underneath the coating to an unacceptable level. The idea was also to avoid the expenses of armoring the line.

These ideas resulted in the design of a subsea line or static umbilical based upon using ordinary carbon steel tubes and use at least one sacrificial element which is constituted by one or more tapes or strips made of a less noble metal than steel is in substantially continuous contact with the surface (s) of at least one carbon steel tube. There may be used a water penetrable cover. The less noble metal could be zinc or aluminium based tapes.

The intention was also to design a cathodic protection system which substantially cover the carbon steel tube surface(s) without an extrusion or galvanization process. The amount of the less noble (Zn/Al) material to be used will depend upon the required lifetime of the line and of the size of the carbon steel area or surface(s) exposed to the sea water in each particular case.

In one embodiment of the invention a new solution is to strand zinc, aluminium or Zn/Al-alloyed tapes over a large center carbon steel tube and over an outer carbon steel tube layer. The outer protection is 'wet'—permeable to water—to ensure electrolytic contact between the Zn/Al tapes underneath the outer protection and possibly damaged areas where the steel tubes are directly exposed to sea water. The cathodic protection system is therefore activated by penetration of water through outer coatings. This is necessary to provide proper cathodic protection to the carbon steel, and cannot be achieved by dry insulating outer protection. The advantage is prolonged corrosion protection of all umbilical tubes.

BRIEF DESCRIPTION OF THE DRAWING

Above mentioned and other features and objects of the present invention will clearly appear from the following detailed description of embodiments of the invention taken in conjunction with the drawing which illustrates a crossection of a line.

DETAILED DESCRIPTION OF THE INVENTION

In the figure is shown an embodiment of a static subsea steel tube umbilical having an inner carbon steel compartment or core 1—which may be a fluid pipe or which may contain one or more electrical cables and/or optical fiber cables (not shown)—encompassed by at least one layer of zinc or aluminium based strip or tape 2. Normally there are at least two such tapes. The steel tube 1 provides mechanical protection to the inner compartment when stranding other elongated elements such as hydraulic tubes 3 (made of carbon steel or stainless steel with or without plastic coating) or cables 4 (electric and/or optical fiber) over the core.

Over the layer of tubes 3 and cables 4 there are provided windings of zinc and/or aluminium based tapes or strips 5 dimensioned such—in combination with the Zn/Al layer 2—as to give the subsea line a desired lifetime. The line may include filler elements 7 and 8 limiting—but not eliminating—free space between longitudinal elements of the line. Substantially all interstices of the line may be filled with bitumen or a non corrosive gel in order to reduce the corrosion rate without preventing penetration of seawater.

As this is a 'wet' design,—the outer layer 6 does not contain an outer waterproof cover. The outer layer 6 consists mainly of bitumen impregnated PP (polypropylene) yarn or the like,—allowing transport of sea water. For mechanical protection and transversal reinforcement there may in addition be windings of carbon steel tape and/or windings of armour wire upon the outer Zn/Al windings 5. Carbon steel tape may also be applied between the outer steel tubes and the outer zinc windings as transversal reinforcement.

In the embodiment of the invention shown,—the dimensions can be as follows: The carbon steel core 1 has an outer diameter of 10–150 mm and it is covered with a layer 2 of two or more 0.1–5 mm thick and 5–500 mm wide Zn/Al tapes wound with a lay length giving a spacing between turns of 1–100 mm. The outer Zn/Al tape/strip layer 5 could be of a similar construction as the layer 2. The sacrificial tapes may, however, also be wound with overlap because such overlap will not prevent the seawater from penetrating the wound layer.

The steel tubes 3 and the inner core 1 should be dimensioned in order to maintain good mechanical contact between the steel tubes and the Zn/Al tapes/strips. It is within the scope of the invention to arrange the steel tubes 3 in more than one layer as long as the cathodic protection system is maintained and wound over the entire bundle. Layers of Zn/Al tapes/strips can be arranged between layers of steel tubes.

The above detailed description of an embodiment of this invention must be taken as an example only and should not be considered as limitations on the scope of protection. The interior of a static subsea line or umbilical will survive many years of installation when ensuring—in accordance with the principles of the invention—that there is sufficient sacrificial material in wet contact with the steel tubes for the lifetime of the line.

The subsea line or umbilical of the present invention is suitable for static installations on the sea bed. When dynamical lines are required,—the steel tube would have to be of the stainless type. The subsea line of the present invention may be taken to a water surface installation through a J-tube which has internal corrosion protection,—or the line would have to be jointed with a dynamical stainless line.

I claim:

1. Subsea line comprising:
   (a) a plurality of elongated elements chosen from a group consisting of steel tubes, electrical conductors, electrical cables, optical fiber cables and combinations thereof, at least one of the elongated elements is a steel tube made of carbon steel;
   (b) at least one sacrificial element, which is constituted by at least one strip made of a material less noble than steel, in substantially continuous contact with the surface of the carbon steel tube, wherein the at least one sacrificial element is applied in at least one helical layer allowing penetration of seawater to the surface of the carbon steel tube; and
   (c) a seawater permeable outer cover.

2. Line according to claim 1, wherein the sacrificial elements are tapes with a thickness of 0.1 to 5 mm and a width of 5 to 500 mm.

3. Line according to claim 1, further including filler elements limiting free space between the plurality of elongated elements.

4. Line according to claim 1, further including a filler material chosen from a group consisting of bitumen and non-corrosive gel and filling substantially all interstices of the line in order to reduce corrosion.

5. Line according to claim 1, wherein the material less noble than steel is chosen from a group consisting of zinc, aluminum and zinc/aluminum alloy.

6. Subsea line comprising:
   (a) a center steel tube;
   (b) a first layer of helical windings covering the center steel tube and chosen from a group consisting of zinc, aluminum and zinc/aluminum alloy;
   (c) a plurality of elongated elements arranged upon the first layer and chosen from a group consisting of steel tubes, electrical conductors, electrical cables, optical fiber cables and combinations thereof;
   (d) an outer layer of helical windings chosen from a group consisting of zinc, aluminum and zinc/aluminum alloy; and
   (e) a seawater permeable outer cover.

7. Line according to claim 6, further including filler elements limiting free space between the plurality of elongated elements.

8. Line according to claim 6, further including a filler material chosen from a group consisting of bitumen and non-corrosive gel and filling substantially all interstices of the line in order to reduce corrosion.

* * * * *